United States Patent

Sitbon et al.

Patent Number: 5,805,884
Date of Patent: Sep. 8, 1998

[54] PROCESS FOR MONITORING EXECUTION OF A COMMAND SCRIPT

[75] Inventors: Gérard Sitbon, Vitry; Didier Champeval, Plaisir; Daniel Gobert, Chilly Mazarin, all of France

[73] Assignee: Bull, S.A., Louveciennes, France

[21] Appl. No.: 630,462

[22] Filed: Apr. 10, 1996

[30] Foreign Application Priority Data

May 12, 1995 [FR] France .................................. 95 05637

[51] Int. Cl.$^6$ .................................................. G06F 12/08
[52] U.S. Cl. ........................ 395/680; 395/681; 395/682; 395/683; 395/684; 395/685; 395/200.31; 395/200.32
[58] Field of Search .............................. 395/200.01, 385, 395/680, 681, 683, 684, 685, 200.31, 200.32; 364/DIG. 1

[56] References Cited

U.S. PATENT DOCUMENTS

| | | | |
|---|---|---|---|
| 5,473,608 | 12/1995 | Gagnes et al. | 370/85.13 |
| 5,509,123 | 4/1996 | Dobbins et al. | 395/200.15 |
| 5,517,622 | 5/1996 | Ivanoff et al. | 395/200.13 |
| 5,600,789 | 2/1997 | Parker et al. | 395/183.14 |
| 5,655,081 | 8/1997 | Bonnell et al. | 395/200.32 |

FOREIGN PATENT DOCUMENTS 0529787 of 1993 European Pat. Off. .

OTHER PUBLICATIONS

Data Communications, vol. 21, No. 4, Mar. 1992, New York US, pp. 47–48, Mary Jandler: "IBM Gets Serious About SNMP".
IBM Technical Disclosure Bulletin, vol. 35, No. 4A, Sep. 1992, New York, US, pp. 182–186, "Service Interface that Supports Simple Network Management Protocol".

*Primary Examiner*—Alyssa H. Bowler
*Assistant Examiner*—Dzung C. Nguyen
*Attorney, Agent, or Firm*—Kerkam, Stowell, Kondracki & Clarke, P.C.; Edward J. Kondracki

[57] ABSTRACT

A process for monitoring the acknowledgement of a request to execute a command script (script) through a non-guaranteed protocol (S.N.M.P.), in an information system (SI) in a network (RE) comprising a manager (GE) and agents (AG1) for executing commands, wherein the manager first sends the agent in charge of executing the command script a ticket request using a command (Get mrsGetTK) of the "get" type, and the agent returns (GetResponse) a ticket to the manager, the manager then sends the execution request to the agent using a command (Set mrsExecute cmd TK) of the "set" type, for which the ticket it a parameter, then the agent verifies the validity of the request and creates an instance for the execution of the command associated with the ticket and the manager then verifies proper reception of the request by scanning (Get mrsStatus) the instance using the agent. The instant invention is particularly applicable to heterogeneous information systems.

2 Claims, 2 Drawing Sheets

PROCESS FOR MONITORING EXECUTION OF A COMMAND SCRIPT

BACKGROUND OF THE INVENTION

The present invention relates to a process for monitoring the execution and script (commonly called a script in by one skilled in the art), more specifically, a process adapted to the management protocol known as S.N.M.P. (English acronym for Simple Network Management Protocol). The latter was developed to meet the need for users to have a simple administration protocol for information systems which include a group of machines (platforms) distributed in a network. S.N.M.P. allows communication between an administration manager and the object managers to be managed, called agents.

This protocol authorizes three actions, which are: the retrieval of information (called "get"), the setting of information (called "set"), and the spontaneous feedback of information (called "trap"). It is supported by shared data bases (Management Information Base, abbreviated M.I.B. in English).

One of the important problems which arises for any user of an information system such as that mentioned above is to be able to monitor all of the platforms therein at regular intervals, by using its administrator to handle heavy and complex management operations.

Consider, then, a central platform PL, on which runs an administrator or manager GE, connected by means of a network RE to a plurality of target platforms administered by the first platform and designated PLC1, PLC2, etc. PL and PLC1, PLC2, etc., form the information system SI.

The communications protocol more particularly used between PL and each of these platforms is precisely S.N.M.P. S.N.M.P is principally used to manage the object described in the M.I.B., and is installed in PL, but it does not ensure reliability in the execution of commands of the "set" type.

In fact, during the execution of a command script through a "set" type command, more commonly called snmpset, it is not actually possible to receive confirmation of the proper execution of this script.

A script will be recalled here that in current practice, a command script is called a "script." It is composed of a set of instructions to be executed, each of which is triggered by a command.

The instant invention monitors the execution of the script by introducing a control protocol on top of by S.N.M.P.

This protocol is based on the concept of a ticket which makes it possible to identify a given script in a unique way.

The invention applies to any protocol which is not guaranteed in the connectionless mode. It will be recalled that in a network, the connectionless mode, called CLNS (English acronym for Connectionless Network Service) is based on the network services and protocols defined by the ISO standard 8473 (ISO is an international standardization organization and is the English acronym for International Organization for Standardization), which itself includes the ISO standard 9542 defining the associated routing mechanisms and protocols.

SUMMARY OF THE INVENTION

According to the instant invention, the process for monitoring the acknowledgement of a request for the execution of a command script (script) through a protocol which is not guaranteed in the connectionless mode (for example the S.N.M.P. type), in an information system comprising a plurality of heterogeneous platforms linked by a network which supports this protocol, one of which, called the command platform, comprises an administration manager, with the other platforms comprising agents for executing commands, is characterized in that it includes the following phases:

A) Before sending the execution request, the manager sends the agent of the platform in charge of executing it a request for an identification ticket, using a command of the "get" type, and the agent returns an identification ticket to the manager.

B) The manager sends the request to execute the command to the agent using a command of the "set" type, for which this ticket is a parameter, then the agent verifies the validity of this ticket and creates an instance for executing the command, an instance which it associates with the ticket; and C) The manager makes sure that the request has been properly received by scanning this instance using the agent.

In a preferred embodiment of the invention, the monitoring process is characterized in that, since the protocol is the S.N.M.P. type and the execution requests are the snmpset type for executing scripts, it includes of the following phases:

A) Before sending the request for the execution of the script, the manager sends the agent of the platform in charge of executing it the ticket request using a snmpget command, and the agent returns the ticket to the manager.

B) The manger sends the request for the execution of the script to the agent using a snmpset command, for which this ticket is a parameter, then the agent verifies the validity of the ticket, creates an instance for the execution of the script, which it associates with the ticket, and starts the execution of the script.

C) The manager carries out this operation using snmpget commands.

D) As soon as the execution of the script has terminated, the manager carries out an operation acknowledging this, by sending the agent a command of the "set" type with an appropriate acknowledgement value.

BRIEF DESCRIPTION OF THE DRAWINGS

Other characteristics and advantages of the present invention will be apparent of the following description, given as a non-limiting example, and in reference to the appended drawings. In these drawings.

DETAILED DESCRIPTION OF THE PREFERRED EMBODIMENTS

1) REVIEW OF THE CONTEXT IN WHICH THE PRESENT INVENTION IS APPLICABLE

Assuming that the manager GE running on PL wants to carry out, through an S.N.M.P. protocol, the execution of scripts SC by the agent AG1 which runs on the platform PLC1 whose operating system SE1 is for example the UNIX type. In other words, in this environment, AG1 is an S.N.M.P. agent which makes it possible, in a UNIX platform, to execute predefined scripts SC for an application running on PL, namely the manager GE.

The application GE monitors the execution of the scripts which it has activated in PLC1 by manipulating objects and their attributes.

At this stage, it is useful to review the following definitions which will facilitate a clearer understanding of the invention.

An object is constituted by any hardware, software or hybrid (both hardware and software) element of an information system.

An object class is a set of objects having a certain number of common properties.

An attribute is a characteristic property of an object. It has a value.

An object instance is a set of attribute values.

These specific objects are divided into two classes C1, C2, (an object class groups the objects having the same properties) and are described in an M.I.B. suitable for AG1, contained in PLC1.

These two classes, respectively named mrs and mrsLog, contain:
  information on the script to be executed, and
  the list of the scripts in the process of being executed respectively.

In order to facilitate a clearer understanding of the invention, it is necessary to briefly review some of the essential characteristics of the S.N.M.P. protocol.

The S.N.M.P. is a protocol for managing (management protocol) open systems interconnected through an "Internet" type network (a network called IP for short). This protocol has, in fact, become a standard protocol.

S.N.M.P. is said to be object-oriented protocol. This means that the managed resources are represented by objects in an M.I.B.

It is based on a management model of the manager/agent type, here GE/AG1.

2) THE PROCESS ACCORDING TO THE INVENTION

As described above, the essence of the invention includes monitoring the execution of any script by introducing, on top of the S.N.M.P., a control protocol which is based on the concept of a ticket which makes it possible to identify the script SC in question. Therefore, an identification ticket TK is associated with the execution of SC, and it is possible to obtain information on this execution at any moment. The utilization of TK is compulsory.

Figure 1:
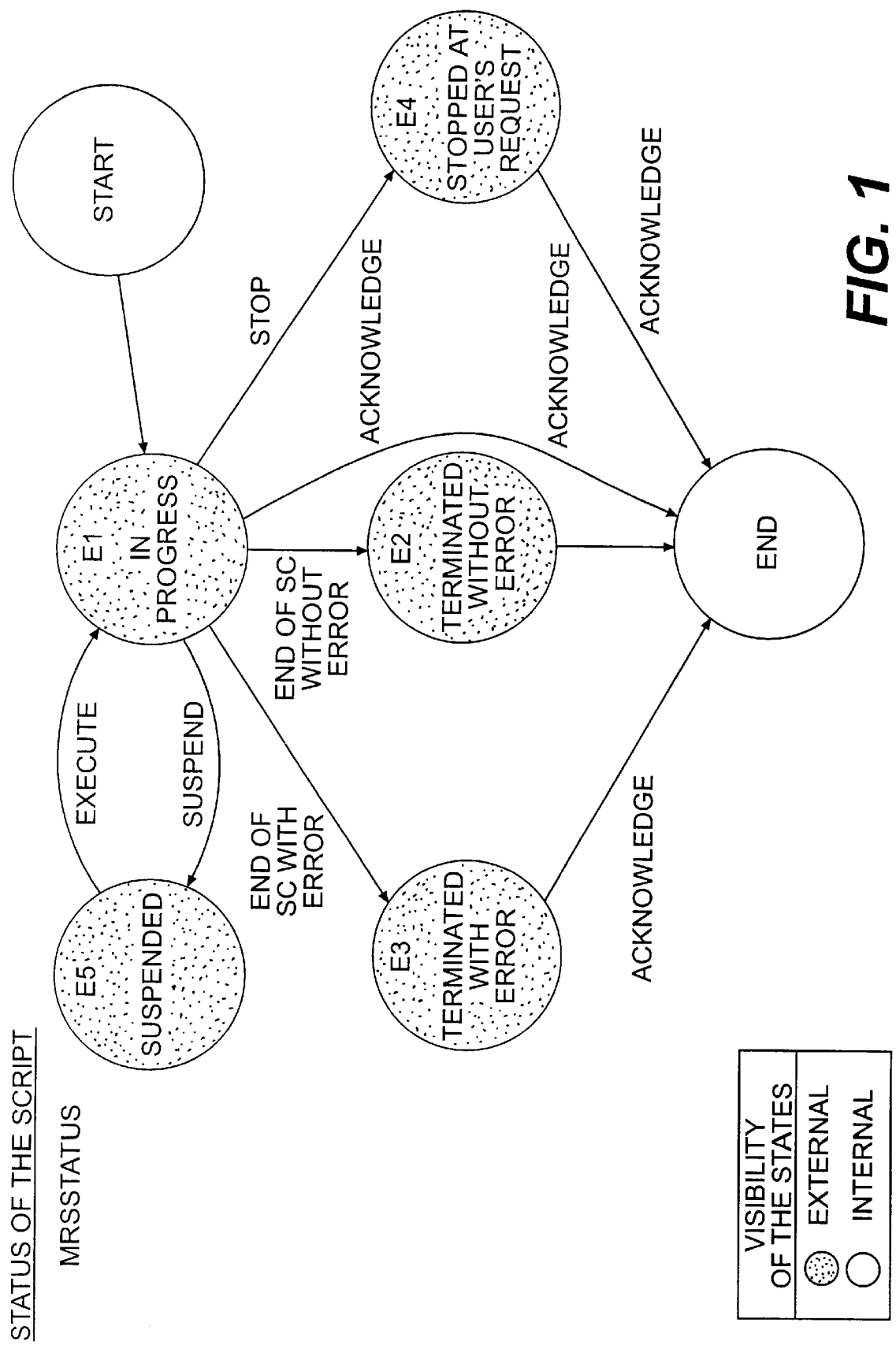
FIG. 1 shows the status diagram of the process according to the invention.
Figure 2:
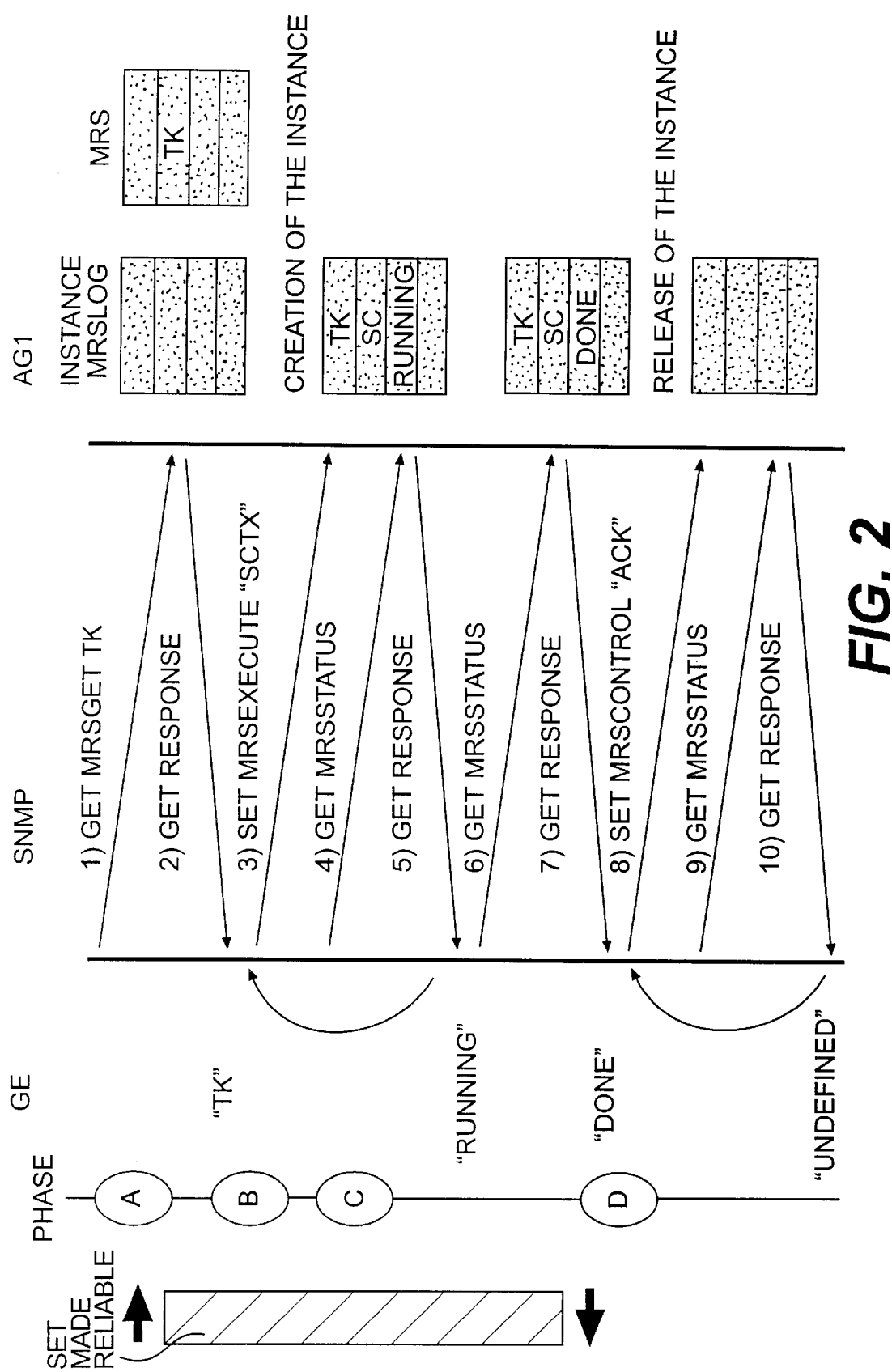
FIG. 2 illustrates the exchanges between the manager and the agent.

The instant process for monitoring the execution of a script SC according to the invention, comprises the following four essential phases A through D, illustrated in FIG. 2. This figure shows the exchanges of data between the manager GE and the agent AG1 during these various phases, with the manager being disposed on the left side of the figure, while the agent is to the right. FIG. 2 also shows, on the AG1 side, the instance for the execution of the script and its contents during the phases A through D.

These phases are shown on the left side of FIG. 2 on the GE side. They are each composed of sub-phases, and this set of sub-phases is numbered from 1 to 10, from top to bottom respectively, in FIG. 2. The names of the data packets exchanged between GE and AG1 is indicated in the middle of the figure between these two, immediately next to the numbers of the subphases.

These phases and sub-phases are the following:

Phase A):

1) The manager GE sends the agent AG1 the request to obtain the ticket TK using a command of the "get" type called snmpget on an attribute called mrsGetTicket. The corresponding data packet is Get mrsGetTicket.

2) The ticket TK returned by AG1 is constituted by a character string formed, on the one hand, by the process identifier PID (as it is known to one skilled in the art, particularly in the UNIX world) of AG1 and, on the other hand, by a sequence number which is incremented by this agent each time it receives a ticket request. The data packet returned by AG1 to GE in this case is GetResponse.

Phase B):

3) The manager GE then sends the agent AG1 a command to execute the script SC, using a snmpset command on an attribute called mrsexecute. The ticket TK obtained during the first phase is used as a parameter of this command. The data packet in this case is Set mrsExecute"cmdTK".

The agent AG1 verifies the validity of the ticket TK and, in case of a positive response, creates an instance for the execution of SC from the class mrsLog, which it associates with TK, which itself belongs to the same class. This is represented in FIG. 2 on the right side of the figure illustrating the instances for the execution of the script SC, namely mrsLog and mrs, along with their contents, on the same side as AG1.

The syntax of the script SC has the form indicated in Appendix 1, which gives the sequence of the various elements which comprise it and their associated meanings.

Phase C):

4–7) The script SC is activated by AG1 with the rights of the user, which in this case is the manager GE. These are formed by the pair of values (uid, gid) as they are defined in the terminology of the UNIX world.

It is appropriate to specify that AG1 does not execute the scripts itself. In fact, it is restricted to requesting PLC1 to do it, which the latter actually accomplishes.

All the scripts are executed simultaneously (in the background, to use the English terminology) which allows AG1 to process other requests of the "get" or "set" type at the same time. In this environment, it is always possible to execute an interrupt action on a script in the process of being executed using a snmpset command.

At any instant in the execution of a script, requests for information on it may be made, which execution is defined by its execution instance. These requests are made using snmpget commands sent by GE to AG1. This is illustrated in FIG. 2 by the sending of a first data packet Get mrsStatus by GE, to which the sending of a first response data packet Get Response by AG1 corresponds, in the sub-phases 4 and 5 respectively, as well as by the sending of a second data packet Get mrsStatus by GE to AG1 and the sending of the corresponding response packet GetResponse by AG1 to GE, in the sub-phases 6 and 7 respectively.

Each instance contains a set of attribute values which characterize the execution of the script, specifically:

The date of the start of execution defined by the attribute called mrsStartTime, The ticket associated with the script defined by the attribute mrsTicket, a control attribute which makes it possible to influence the progress of the execution of the script, designated by mrscontrol, an execution status defined by the attribute mrsStatus, an attribute for describing any problem which arises during the execution, indicating the exact reason for it, and designated by mrsProblemType, the standard outputs from the script (mrsStdOut, mrsStdErr) and the control attributes which correspond to them, namely mrsStdOutMode, mrsStdOutStatus.

If the instance of the script does not exist, this means that the script has not been activated.

It is appropriate to note that each of the attributes mentioned above is created within the scope of the invention (attributes whose names begin with mrs).

The execution status indicates the state the script is in, and the combination of these states defines the status diagram shown in FIG. 2.

The various possible states are the following:

state E1, called "in the process of execution" (running,)

state E2, called "terminated without error" (done,)

state E3, called "terminated with an error" (failed,)

state E4, called "terminated at user's request" (killed,)

State E5, called "waiting for execution" (waiting,)

When AG1 gives PLC the order to execute the script (an order called "run"), the latter passes into the state E1.

If, from E1 onward, AG1 gives the order to suspend SC, the latter passes into the state E5. It will be returned to the state E1 by an execution order ("run") from AG1.

From E1, SC can pass into the states E2, E3, or E4.

If the execution of SC is terminated, it passes from the state E1 to E2.

If the execution is terminated with an error, it passes from the E1 to E3.

If AG1 decides to stop the execution of SC (a "kill" order), it passes into the state E4.

The confirmation of the termination of a script SC can be obtained in two different ways:

either synchronously, by means of successive readings (polling,) of the status of the script, or asynchronously, upon reception of a termination event (see below).

Phase D):

8) An action acknowledging the execution of the script is carried out in order to free up the resources (memories, files) associated with the instance of the latter. For this purpose, a snmpset command is sent on the control attribute of the script instance (mrscontrol) with the appropriate value (ack), which signifies, "must acknowledge". The corresponding data packet in this case is Set mrsControl"ack".

9) Once the acknowledgement is retrieved by the agent AG1, it is no longer possible to access the information of this instance. In fact, the latter releases the execution instance from the script SC and this instance is then empty of any information.

9–10) Under these conditions, if GE sends a data packet Get mrsStatus to AG1, AG1 returns to it a response packet Get Response, which indicates to it that the execution instance is empty and that consequently the execution of the script has terminated.

3) THE DETECTION OF ERRORS

When an error is detected during the execution of a script, the mechanism for executing the script is interrupted. The status attribute mrsStatus is set at the value failed (see above), which indicates an "error." AG1 assigns the attribute describing the problem mrsProblemType a value which makes it possible to establish the origin of the problem, namely:

- syntaxError, which means: an error in the syntax

- internalError, which means: internal errors in the agent

- scriptfailure, which means: internal errors in the script SC

- invaliduser, which means: access by an unknown user.

The standard error output (mrsStdErr) contains the error message returned by the script SC. In this case, the attribute mrsProblemType contains the value scriptFailure.

4) TERMINATION OF THE SCRIPT

1) Forced termination:

It is possible to force the termination of a script SC by triggering, by means of GE, a snmpset command on the control attribute mrsControl of the instance of SC, which has the appropriate value kill, meaning "stop." The agent AG1 then abruptly interrupts the execution of SC and the script status mrsStatus is set at the value killed, meaning "interrupted."

2) Termination event:

The termination of a script is indicated by the emission by AG1 of an event called snmpTrap, as provided in the S.N.M.P. protocol. Two types of events are used:

one which indicates the termination without error of the script. An attribute called mrsTrapDoneMode of the execution instance makes it possible to activate this mechanism by having the value on, which means "activation," or to deactivate it by having the value off, which means "deactivation." By default, this value is off.

the other indicates that the script has failed (mrsFailed).

This termination process is in complete conformity with the S.N.M.P. protocol.

5) SUSPENSION OF THE EXECUTION OF THE SCRIPT

GE can suspend the execution of a script by means of a snmpset command on the control attribute mrscontrol with the value (suspend) and can reactivate it with the value (run).

6) RETRIEVAL OF THE STANDARD OUTPUTS

The standard outputs of the scripts (called stdout et stderr, in the UNIX world) are returned to temporary files which are identifiable by the ticket TK (for example files called ticket.stderr and ticket.stout).

These data are available as long as the execution instance of the script has not been acknowledged by GE (ack).

These output data are read page by page by a reading mechanism; they contain a whole number of lines and are accessed sequentially by means of successive reading commands (snmpget) on the attribute mrsStdOut of the execution instance.

The state of the current page of the standard output is indicated by the attribute mrsStdOutState. It can have the values given in Appendix 2.

Appendix 1

Here is the description in BNF form (Backus Naur Format standard) of the grammar for the script interfaces:

The terminal symbols are indicated in simple quotes.

For example: 'xyz' denotes the character string xyz in the file. The terminal symbols can also contain regular expressions.

The other symbols are non-terminal symbols.

The alternatives are denoted by a|and grouped by braces, for example {A E|B} denotes either A and E or B.

The optional parts are indicated between brackets.

For example: [C] denotes that C is optional.

The annotations between parentheses are comments on the grammar. >>>>STAR OF BNF
SCRIPT :=HEADER PARAMS
COMMENT :='#.*\n' (comments on the shell)
HEADER :=SCRIPT_TITLE {SCRIPT_HELP SCRIPT_EXEC |SCRIPT_EXEC SCRIPT_HELP}
(the HELP may be placed before or after the name of the executable)
PARAMS :={PARAMS PARAM|PARAM}

SCRIPT_TITLE :='title' '=' STRING (if desiring to use this title in the main window for choosing the script, it may be necessary to limit its size)
SCRIPT_HELP :='help' '=' STRING
SCRIPT_EXEC :='script' '=' FILENAME (this line could be optional; in this case, the same name as the interface file would be used)
FILENAME :=ID (It may be necessary to authorize more than ID as a file name)
PARAM :='param' ID '=' PARAM_PROMPT PARAM_HELP PARAM_TYPE
PARAM_PROMPT :=STRING (the PROMPT for the parameter)
PARAM_HELP :=STRING (the HELP for the parameter)
PARAM TYPE :={ENTRY|TEXTLIST|OPTION|RADIO|PASSWD SELECTION|SLIST|MLIST|INTEGER INDIRECT} (simple text line:)
ENTRY :='text' ENTRY_WIDTH [ENTRY_DEFAULT_VALUE]
ENTRY_WIDTH :=NUMBER (the length of the text line)
ENTRY_DEFAULT_VALUE :='('STRING')' (value which will initially be displayed for the parameter. By default, it is an empty string.)
(text line passwd displaying *s in place of the characters:)
PASSWD:='passwd'
(text line accepting only numbers:)
INTEGER:='integer' [INTEGER_DEFAULT_VALUE]
INTEGER_DEFAULT_VALUE :='('NUMBER')' (value which will initially be displayed for the parameter. By default, it is 0.)
(text with several lines:)
TEXTLIST :='textlist' ROW_COL [TEXTLIST_DEFAULT_VALUE]
ROW_COL:=NUMBER 'x' NUMBER (number of lines x number of columns in the text, all close together
TEXTLIST_DEFAULT_VALUE :='('STRING_LIST')' (list of strings which will initially be displayed, one per line. By default, nothing is displayed.)
(Boolean choice (toggle button):)
OPTION :='option' INIT_OPTION
INIT_OPTION :='('{'false'|'true'}')' (The default value of the toggle button:
true<->thrown)
(single choice by Radio Buttons:)
RADIO :='radio' '('PROMPT_VAL_LIST')'
PROMPT_VAL_LIST :={PROMPT_VAL_LIST ',' PROMPT_VAL|
PROMPT_VAL } (prompt_val list separated by commas)
PROMPT_VAL :='('PROMPT ',' VAL [',"DEFAULT"]')'
(For each prompt_val, a radio button is created which has PROMPT as its prompt and which will return the value VAL if it is selected. The optional part makes it possible to give the button initially selected from the list of buttons. If there is no default given, the first is chosen. If several defaults are given, a warning is sent and the last default given in the list is chosen.)
(single choice by Option Menu:)
SELECTION:='selection' SELECTION_LIST
(choice by single selection list:)
SLIST :='slist' SELECTION_LIST
(choice by multiple selection list:)
MLIST :='mlist' SELECTION_LIST
SELECTION_LIST :='('STRING_LIST')'(list of strings from which the choice must be made)
(indirect dynamic selection parameters:)
INDIRECT :='indirect' {INDIRECT_LOCAL|INDIRECT_|
INDIRECT_SQL}
INDIRECT_LOCAL :='local' INDIRECT_LOCAL_CMD
INDIRECT_LOCAL_CMD :='('CMD[ARGS]')' (command and list of the parameters of the command which will be polled locally in order to construct the list of possible choices. The command must write the choices in stdout, one choice per line.)
CMD :=STRING
ARGS:={STRING|ARGS STRING}
INDIRECT_SNMP :='snmp' INDIRECT_SNMP_CMD
INDIRECT_SNMP_CMD :='('[SNMP_CLASS_INSTANCES ] SNMP_CLASS')'
SNMP_CLASS :=ID
SNMP_INSTANCE :=STRING
SNMP_CLASS_INSTANCE :='('SNMP_CLASS SNMP_INSTANCE')'
SNMP_CLASS_INSTANCES :'{SNMP_CLASS_INSTANCE|SNMP_CLASS_INSTANCES SNMP_CLASS_INSTANCE}
INDIRECT_SQL :='sql''('INDIRECT_SQL_CMD')'
INDIRECT_SQL_CMD SQL_CONNECTID SQL_TABLES
SQL_ATTRIBUTES
[SQL_CONDITIONS]
SQL_CONNECTID:=STRING (per sml)
SQL_TABLES:='('ID_LIST')'
SQL_ATTRIBUTES:='('ID_LIST')'
SQL_CONDITIONS :='('SQL_CONDITION [{'and'|'or'}
SQL_CONDITIONS]')'
SQL_CONDITION :=SQL_CONDITIONS|STRING (to review: an
SQL_CONDITION must be parsed, it cannot be a STRING)
ID$_{13}$ LIST:={ID|ID_LIST ID}
STRING_LIST:={STRING|STRING_LIST ',' STRING}
STRING :='"["]* "' (any character string between double quotes. May be on several lines. For the moment, does not recognize special characters like \n or \t.)
ID :='[a-zA-Z][a-zA-Z0-9_]*' (identifiers (<->variable names))
NUMBER :='[1-9] [0-9]*' (whole number) <<<<END OF BNF
Types can be added, for example FREE_INTEGER which would be a text line which accepts only integers, or BOUND_INTEGER which would be an XmScale.

Appendix 2

The state of the current page of the standard output is indicated by the attribute mrsStdOutState. It can have the following values:
first page (top): for the first page,
last page (bottom): for the last page,
any page (any): for any page located between the first and last page
single page (all): if the message stays on a single page,
overflow (overflow): the page requested is outside the authorized limits
empty (empty): no page
The pages are identified by a page number. This number is returned by the attribute mrsStdOutNbPage.

We claim:

1. A process for monitoring an acknowledgement of a request for execution of a command script (script) through a protocol which is not guaranteed in a connectionless mode, in an information system (SI) having a plurality of heterogeneous platforms (PL. PLC1, and PLC2), a network (RE) for linking said platform and supporting said protocol, one of said platforms being a command platform (PL), having a manager (GE), the other of said platforms comprising agents (AG1, and AG2,) for executing commands, said process comprising the following steps:

A) sending a request (Get mrsGetTK) for an identification ticket using a command of the "get" type, from the manager (GE), to the agent (AG1) of the platform (PLC1) in charge of executing the command request and returning from the agent (AG1) (GetResponse) an identification ticket (TK) to the manager;

B) sending the request to execute the command (Set mrsExecute "cmd Tk") from the manager to the agent using a command of the "set" type, for which said ticket is a parameter, then verifying validity of the identification ticket by the agent and creating by said agent an instance for the execution of the command, which the agent associates with the identification ticket (TK), and C) confirming by the manager proper reception of the request by scanning said instance (Get mrsStatus) by means of the agent and, using the identification ticket, monitoring the progress of the execution of the request.

2. The monitoring process according to claim 1, wherein the protocol is the S.N.M.P. type and the execution requests are the snmpset type for executing the command scripts, said process further including:

A) using a snmpget command for the identification ticket request by the manager (GE), and using the agent to return the identification ticket to the manager, B) using a snmpset command to request execution of the command script by the manager (GE) to the agent (AG1), said identification ticket being a parameter of said snmpset command, C) using said snmpget command by the manager to confirm proper reception of the request, and D) as soon as the execution of the command script has terminated, using the manager to carry out an operation acknowledging said termination, by sending the agent a command (Set mrsControl "ack") of the "set" type with an appropriate acknowledgement value.

* * * * *

UNITED STATES PATENT AND TRADEMARK OFFICE
CERTIFICATE OF CORRECTION

PATENT NO.   : 5,805,884
DATED        : September 08, 1998
INVENTOR(S)  : Gerard SITBON et al.

It is certified that error appears in the above-indentified patent and that said Letters Patent is hereby corrected as shown below:

Title page, Item [56] References cited, (Other Publications), line 2,
Following "Mary" change "Jandler" to - - Jander - - .

Item [57] In the Abstract, line 12,
after "ticket" change "it" to read - - is - -.

Signed and Sealed this

Twenty-first Day of September, 1999

*Attest:*

Q. TODD DICKINSON

*Attesting Officer*   *Acting Commissioner of Patents and Trademarks*